United States Patent
Menchetti

(10) Patent No.: US 12,335,378 B2
(45) Date of Patent: Jun. 17, 2025

(54) TO QUANTUM KEY DISTRIBUTION

(71) Applicant: British Telecommunications Public Limited Company, London (GB)

(72) Inventor: Marco Menchetti, London (GB)

(73) Assignee: British Telecommunications Public Limited Company, London (GB)

( * ) Notice: Subject to any disclaimer, the term of this patent is extended or adjusted under 35 U.S.C. 154(b) by 271 days.

(21) Appl. No.: 17/754,170

(22) PCT Filed: Aug. 18, 2020

(86) PCT No.: PCT/EP2020/073086
§ 371 (c)(1),
(2) Date: Mar. 25, 2022

(87) PCT Pub. No.: WO2021/063590
PCT Pub. Date: Apr. 8, 2021

(65) Prior Publication Data
US 2022/0294619 A1    Sep. 15, 2022

(30) Foreign Application Priority Data

Sep. 30, 2019 (EP) .................................. 19200429

(51) Int. Cl.
*H04L 9/08* (2006.01)

(52) U.S. Cl.
CPC .......... *H04L 9/0858* (2013.01); *H04L 9/0825* (2013.01); *H04L 9/0866* (2013.01)

(58) Field of Classification Search
CPC ... H04L 9/0858; H04L 9/0825; H04L 9/0866; H04L 9/0861
See application file for complete search history.

(56) References Cited

U.S. PATENT DOCUMENTS 7,460,669 B2    12/2008    Foden et al.
7,936,883 B2    5/2011    Imai et al.
(Continued)

FOREIGN PATENT DOCUMENTS

CN    208433979 U    1/2019
GB    2297448 A    7/1996
(Continued)

OTHER PUBLICATIONS

Bennett C.H., et al., "Quantum Cryptography: Public Key Distribution and Coin Tossing," Theoretical Computer Science, 2014, vol. 560, pp. 7-11.
(Continued)

*Primary Examiner* — Farid Homayounmehr
*Assistant Examiner* — Mudasiru K Olaegbe
(74) *Attorney, Agent, or Firm* — EIP US LLP

(57) ABSTRACT

There is herein disclosed a method of establishing at least a portion of an encryption key, the method including transmitting a first photon along a channel, determining the length of time the first photon takes to propagate along the channel, making a modification to the channel so as to change the length of time it takes a photon to propagate along the channel, transmitting a second photon along the modified channel, determining the length of time the second photon takes to propagate along the modified channel, using the determined lengths of time to determine the at least a portion of an encryption key, and, separately, using the fact that a modification has been made to the channel to determine the at least a portion of an encryption key.

10 Claims, 3 Drawing Sheets

(56) References Cited

U.S. PATENT DOCUMENTS

| | | | |
|---|---|---|---|
| 9,036,817 B1* | 5/2015 | Hunt | H04L 9/0852 380/44 |
| 9,148,225 B2* | 9/2015 | Lowans | H04B 10/70 |
| 10,735,328 B2 | 8/2020 | Ochi et al. | |
| 2002/0097874 A1 | 7/2002 | Foden et al. | |
| 2005/0135620 A1* | 6/2005 | Kastella | H04L 9/12 380/256 |
| 2005/0190921 A1* | 9/2005 | Schlafer | H04L 9/0858 380/278 |
| 2006/0222180 A1* | 10/2006 | Elliott | H04L 9/0852 380/278 |
| 2008/0101612 A1 | 5/2008 | Imai et al. | |
| 2008/0175385 A1 | 7/2008 | Lee et al. | |
| 2009/0180615 A1 | 7/2009 | Trifonov | |
| 2010/0027794 A1 | 2/2010 | Yuan et al. | |
| 2010/0290626 A1 | 11/2010 | Jenkins et al. | |
| 2014/0112478 A1 | 4/2014 | Arahira | |
| 2017/0237666 A1 | 8/2017 | Ochi et al. | |
| 2018/0062838 A1 | 3/2018 | Godfrey et al. | |
| 2021/0006337 A1* | 1/2021 | Ling | H04L 9/085 |
| 2021/0152346 A1 | 5/2021 | Bucklew et al. | |
| 2022/0166611 A1* | 5/2022 | Lord | H04B 10/25 |
| 2022/0294618 A1 | 9/2022 | Lord | |
| 2022/0311604 A1* | 9/2022 | Kaplan | H04L 9/0855 |

FOREIGN PATENT DOCUMENTS

| | | |
|---|---|---|
| GB | 2430123 A | 3/2007 |
| GB | 2534917 A | 8/2016 |
| GB | 2536248 A | 9/2016 |
| IE | 20020742 A1 | 4/2003 |
| WO | WO-2009145392 A1 | 12/2009 |
| WO | WO-2019070347 A1 | 4/2019 |

OTHER PUBLICATIONS

Combined Search and Examination Report for Great Britain Application No. 1914062.3, mailed on May 6, 2020, 7 pages.
Examination Report for Great Britain Application No. 1914062.3, mailed on Dec. 3, 2021, 7 pages.
Extended European Search Report for Application No. 19200429.9, mailed on Mar. 2, 2020, 7 pages.
International Search Report and Written Opinion for Application No. PCT/EP2020/073086, mailed on Oct. 20, 2020, 11 pages.
Stucki D., et al., "Fast and Simple One-Way Quantum Key Distribution," Applied Physics Letters, Jun. 13, 2005, 4 pages.
Combined Search and Examination Report under Sections 17 and 18(3) for Great Britain Application No. 2110994.7, mailed May 3, 2022, 10 pages.
Examination Report under 18(3) for Great Britain Patent Application No. 2001339.7, mailed on Jun. 6, 2022, 3 pages.
Examination Report under 18(3) for Great Britain Patent Application No. 2001339.7, mailed on Nov. 30, 2021, 3 pages.
Examination Report under Section 18(3) for Great Britain Patent Application No. 1914062.3, mailed on Apr. 26, 2022, 3 pages.
Extended European Search Report for Application No. 20154838.5, mailed on Jun. 23, 2020, 5 pages.
International Preliminary Report on Patentability and Written Opinion for PCT Patent Application No. PCT/EP2020/073086, mailed on Apr. 14, 2022, 8 pages.
International Preliminary Report on Patentability for PCT Patent Application No. PCT/EP2021/050643, mailed on Aug. 11, 2022, 10 pages.
International Search Report and Written Opinion for Application No. PCT/EP2022/069591, mailed on Nov. 7, 2022, 10 pages.
International Search Report and Written Opinion for PCT Patent Application No. PCT/EP2021/050643 mailed on Feb. 25, 2021, 12 pages.
Search Report under Section 17(5) for Great Britain Patent Application No. 2001339.7, mailed on Oct. 27, 2020, 4 pages.
Bennett, et al., "Quantum Cryptography: Public Key Distribution and Coin Tossing", In Proceedings of IEEE International Conference on Computers, Systems and Signal Processing, Dec. 9-12, 1984, 7 pages.
Gobby, et al., "Quantum Key Distribution Over 122 Km of Standard Telecom Fiber", Applied Physics Letters, vol. 84, 2004, pp. 3762-3764 (pp. 1-14).
Hugues-Salas, et al., "Monitoring and Physical-Layer Attack Mitigation In SDN-Controlled Quantum Key Distribution Networks", Journal of Optical Communications and Networking, IEEE, vol. 11, No. 2, Feb. 2019, pp. A209-A218.
Zhang, et al., "Generalized PPM-based BB84 QKD Protocol", Disclosure 3: ICTON 2014 Tu.B1 .5, 2014, pp. 1-4.

* cited by examiner

TO QUANTUM KEY DISTRIBUTION

PRIORITY CLAIM

The present application is a National Phase entry of PCT Application No. PCT/EP2020/073086, filed Aug. 18, 2020, which claims priority from EP Patent Application No. 19200429.9, filed Sep. 30, 2019, each of which is hereby fully incorporated herein by reference.

BACKGROUND

Quantum Key Distribution (QKD) is a method of establishing a secret key between two parties (for illustrative purposes referred to as Alice and Bob). In one example of QKD, Alice generates a single-photon pulse and encodes it with a randomly-chosen bit value of one or zero. The encoded pulse is then prepared in one of two basis states. The basis state is randomly-chosen. Bob then measures the pulse in Bob's own randomly-chosen basis state. If Alice and Bob chose the same basis state, the bit value measured by Bob will be the same as that encoded onto the pulse by Alice. If Alice and Bob chose different basis states, the bit value measured by Bob may not be the same as that measured by Alice. This process is repeated for multiple pulses. Bob sends Alice, by a classical channel, an indication of which basis states Bob used for each pulse and Alice sends Bob, by the classical channel, an indication of which pulses they both used the same basis states for. Alice and Bob discard the bit values corresponding to pulses for which they used different basis states. This leaves them with the same list of bit values which they can use to encrypt communications between themselves.

This process is time consuming and requires expensive hardware. There is a desire for an improved QKD method which addresses these issues.

SUMMARY

According to a first aspect of the disclosure there is provided a method of establishing at least a portion of an encryption key, the method comprising transmitting a first photon along a channel, determining the length of time the first photon takes to propagate along the channel, making a modification to the channel so as to change the length of time it takes a photon to propagate along the channel, transmitting a second photon along the modified channel, determining the length of time the second photon takes to propagate along the modified channel, using the determined lengths of time to determine the at least a portion of an encryption key, and, separately, using the fact that a modification has been made to the channel to determine the at least a portion of an encryption key.

According to a second aspect of the disclosure there is provided a system for establishing at least a portion of an encryption key, the method comprising a transmitter adapted to transmit a first photon along a channel, means for determining the length of time the first photon takes to propagate along the channel, a channel modifier for making a modification to a channel so as to change the length of time it takes a photon to propagate along the channel, a transmitter adapted to transmit a second photon along the modified channel, means for determining the length of time the second photon takes to propagate along the modified channel, means for using the determined lengths of time to determine the at least a portion of an encryption key, and, separately, means for using the fact that a modification has been made to the channel to determine the at least a portion of an encryption key.

Embodiments of this disclosure enable a method to be performed in which a bit value can be encoded onto a photon by modifying the photon's path so that it takes longer to propagate along the path. This can be done with relatively simple, inexpensive hardware, negating the need, for example, to prepare and measure encoded photons in basis states based on phase or polarization.

It is not intended to restrict the order in which the operations of the first aspect of the disclosure are performed to the order in which they are stated. For example, transmitting a second photon along the modified channel may occur after determining the length of time the first photon takes to propagate along the channel.

Using the determined length of time to determine the at least a portion of an encryption key may comprise determining whether or not a modification has been made to the channel. The method may further comprise making a record that the modification has been made. Using the modification made to the channel to determine the at least a portion of an encryption key may comprise using the record.

The encryption key may be established between a first entity and a second entity. Transmitting the first and/or the second photon may be performed by the first entity. Determining the length of time the first photon takes to propagate along the channel may comprise receiving the photon and may comprise comparing the time the first photon was transmitted with the time the first photon was received. Receiving the first photon may be performed by the first entity. Determining the length of time the first photon takes to propagate along the channel may be performed by the first entity.

Determining the length of time the second photon takes to propagate along the modified channel may comprise receiving the second photon and may comprise comparing the time the second photon was transmitted with the time the second photon was received. Receiving a second photon may be performed by the first entity. Determining the length of time the second photon takes to propagate along the modified channel may be performed by the first entity.

Making a modification to a channel so as to change the length of time it takes a photon to propagate along the channel may be performed by the second entity. This may comprise changing the length of the channel. This may comprise encoding a bit value onto a photon. The encoded bit value may be 1 or 0. The method may comprise encoding more than one bit value. The channel modifier may have a branched portion with multiple branches arranged in parallel. Making a modification to the channel may comprise causing the photon to propagate along a different one of the multiple branches. The branches may be of differing lengths. Modifying the channel may be performed using one or more optical switches. The one or more optical switches may guide the photon along one or more optical branches. The branched portion may comprise two branches. Alternatively, the branched portion may comprise three, four or more branches. The branched portion may be fully contained within the second entity. The branches may be optical fibers. Making a record that the modification has been made may be performed by the second entity. The method may further comprise making a record of the time the modification was made. The channel may extend from the transmitter to the receiver and may comprise optical fiber.

In some embodiments there are two or more branched portions connected in series. Each of the two or more branched portions may have its own optical switch. Each of the two or more branched portions may have two or more branches.

The method may be repeated for a plurality of photons. The first photon and/or the second photon may be a single photon. Modifying the channel may be performed repeatedly and may comprise determining whether or not to make a modification at a given time. This determination may be performed periodically and may have a periodicity of the order of one microsecond. This determining may be randomly determined, and may use a random number from a random number generator.

The first entity may use frequency downconversion to produce a photon for transmission. The transmitted photon may be one of an entangled pair. The first entity may determine and may record the time of transmission of the photon. This may be determined by detection of the other photon of the entangled pair.

Determining the length of time a photon takes to propagate along the channel or the modified channel may use the time of receipt of the other member of its entangled pair.

Using the record to determine the at least a portion of an encryption key comprises determining whether a modification has been made to the channel at the time a photon passes. This may comprise using the time of receipt of the photon. The second entity may receive an indication of the time of receipt of the photon from the first entity. The first entity may send the indication of the time of receipt of the photon over a second channel, separate to the channel. The second channel may be a non-quantum channel.

BRIEF DESCRIPTION OF THE DRAWINGS

A specific embodiment according to the disclosure will now be described in detail, for illustration only, with reference to the appended drawings, in which.

DETAILED DESCRIPTION

Figure 1:
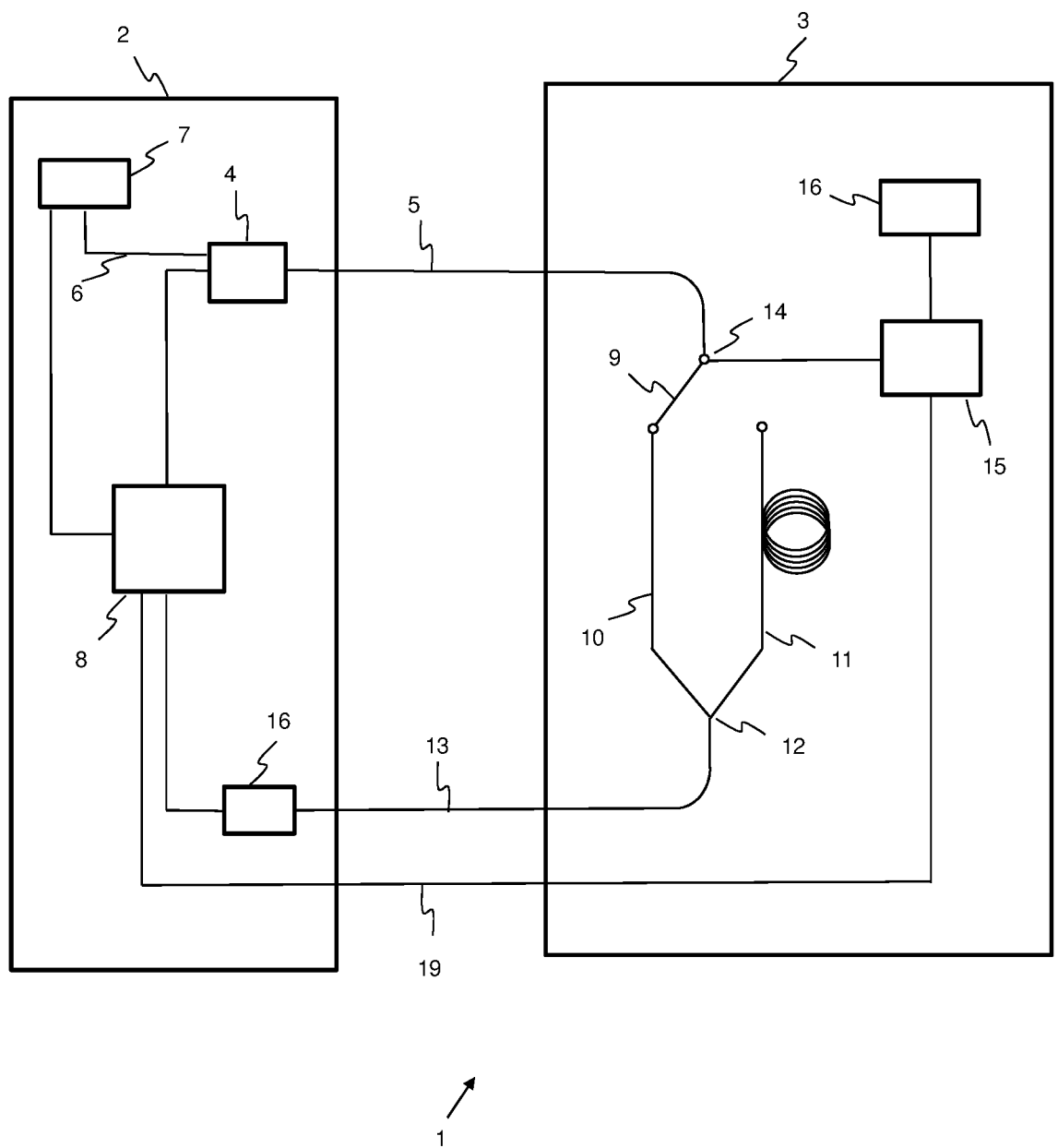
FIG. 1 is a schematic drawing of a system according to an embodiment of the disclosure.

A system according to the disclosure is shown generally at 1 in FIG. 1. The system comprises two communicating entities Alice 2 and Bob 3. Alice 2 comprises a transmitter 4 arranged to produce a series of entangled photon pairs by frequency downconversion. This is a well-known technique and will not be described here. The transmitter is adapted to transmit one photon from each pair along optical fiber 6 to detector 7. Detector 7 is electrically connected to a controller 8. The optical fiber 5 extends from Alice 2 to Bob 3. Bob 3 contains an optical switch 9 which is movable about pivot 14 between two switching positions. In the first switching position the switch connects the fiber 5 to a first optical branch 10. In the second switching position the switch connects the fiber 5 to a second optical branch 11. Second optical branch 11 is longer than first optical branch 10. The first optical branch 10 and second optical branch 11 both connect to return optical fiber 13 at junction 12. Pivot 14 is electrically connected to controller 15 such that controller 15 is able to control the movement of the switch 9. A random number generator 16 is provided which is arranged to provide a random number to controller 15. The controller 15 is adapted to change the switching position of the switch 9 periodically using the random number, such that the switching position at any given time is random. Furthermore, Bob 3 is provided with a data store (not shown) adapted to store the changes made to the switching position along with the time each change was made. The return fiber 13 extends from junction 12 to Alice 2 and is arranged to provide an input to receiver 16 of Alice 2. Receiver 16 is adapted to provide an electrical input to controller 8 of Alice 2.

In use, the transmitter 4 produces an entangled pair of photons by frequency downconversion. The transmitter 4 transmits one photon of the pair along fiber 6 where it is detected at detector 7. The exact time detector 7 detects the photon is stored in a data store (not shown) within Alice 2. The other photon of the pair is transmitted along outbound fiber 5 to Bob 3. The photon propagates along switch 9 followed by whichever of the two optical branches 10, 11, switch 9 is connected to at that instant. If switch 9 is connected to neither optical branch 10, 11, i.e. it is between switching positions, the photon escapes from the circuit and is lost. In the example of FIG. 1, switch 9 is connected to optical branch 10 and so the photon propagates along optical branch 10. If instead the switch 9 had been connected to optical branch 11, the photon would have propagated along optical branch 11. In either case, the photon propagates through junction 12, return fiber 13, and is received at receiver 16 in Alice. Receiver 16 communicates the time of arrive of the photon 16 to controller 8 of Alice.

Controller 8 uses the time of detection at detector 7 and the time of detection at receiver 16 to determine the time of flight of the photon, in other words the time between transmission of the photon by the transmitter 4 and receipt of the photon at the receiver 16. The controller uses this, along with the speed of light to determine the distance travelled by the photon, i.e. the length of the circuit. Controller 8 is aware of the length of the circuit, both when the switch 9 is connected to optical branch 10 and when switch 9 is connected to optical branch 11. Controller 8 uses this to determine the switching position of the switch 9 at the instant the photon passed through the switch 9. Controller 8 instructs a second transmitter (not shown) within Alice to transmit to a receiver (not shown) in Bob, the time the photon was received by receiver 16. This is done via a classical (i.e. non-quantum) channel 19. Bob's controller 15 uses its record of switching positions of switch 9 to determine the switching position at the instant the photon passed through the switch 9. In this way both the controller 8 of Alice and the controller 15 of Bob are aware of the switching position at the instant the photon passed through switch 9. Prior to commencement of the process, one of the switching positions was assigned a bit value of 0 and the other was assigned a bit value of 1. Both controllers are aware of the assigned bit values. For each photon received at receiver 16 of Alice, both controllers record the bit value corresponding to the optical branch taken by the photon. In this way both Alice and Bob build up the same string of bit values. This string is then used to encrypt data that is then sent between Alice and Bob over classical channel.

An eavesdropper (hereinafter referred to as Eve), may attempt to fool Alice into believing that it is the Bob with which Alice wishes to establish a key. Such an Eve may have the same features as the Bob described above in relation to FIG. 1 (such as a branched optical path and controllable switch). If Alice is fooled, Alice may establish a shared secret key with Eve in the manner described above. Alice may then send secret data, encrypted using the key, to Eve in the mistaken belief that Eve is Bob. This is known as a "man in the middle" attack. To avoid this, Alice and Bob perform an authentication check before the QKD process begins. This uses a secret known to Alice and Bob and is a well-known process so won't be discussed here.

Another technique Eve may use is to intercept photons as they propagate along the return fiber 13. If Eve intercepts a photon in this way, that photon will not reach Alice. As a result, Alice does not perform (i) comparing the transmission and reception time of the photon to determine the optical branch it took within Bob; or (ii) sending the reception time for that photon to Bob. Therefore neither Alice nor Bob establish a secret bit value in relation to that photon. Therefore any information that Eve may derive from that photon is of no use in deriving the shared secret key. After intercepting a photon, Eve may send a "replica" photon to Alice in an attempt to fool Alice that the replica photon is the photon Alice transmitted. If this happened Alice would receive the photon at a different time than if it were the photon Alice transmitted. Alice can determine from this that Eve is present.

Alternatively Eve may attempt to insert its own photons into the circuit at a location on the outbound fiber 5, such that it propagates through Bob, and then attempt to intercept them at a location on the return fiber 13. Eve may then measure the time between insertion and interception for each photon (which I will call the "transit time"). If Eve repeats this process for multiple photons and determines the transit time for each, Eve can determine how the switching position of switch 9 changes over time. However, this would not reveal the shared secret key as Eve does not know the frequency of transmission of the photons from Alice. Furthermore, intercepting its own photons could not realistically be done without also intercepting some of the photons sent by Alice. This would result in Alice not receiving photons it expects to receive, and from this Alice can determine that Eve is present. Furthermore, for increased security, the length of the optical branches can be changed.

Figure 2:
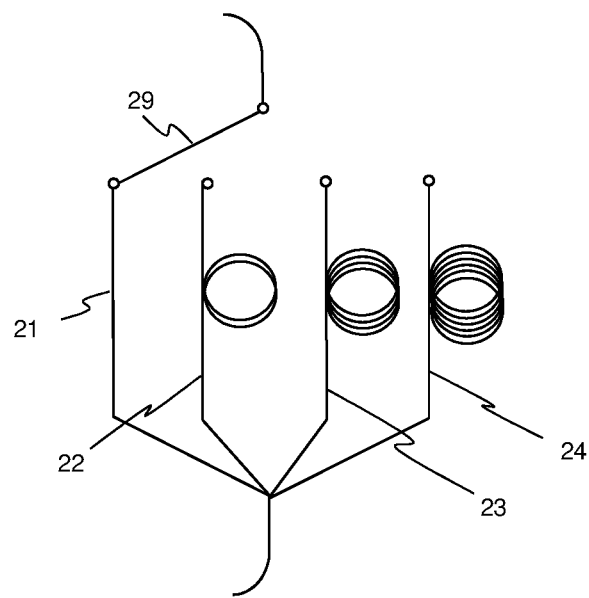
FIG. 2 is a schematic drawing of an alternative optical branch arrangement in accordance with an embodiment of the disclosure.

Alternative optical branch arrangements within Bob are possible. One such arrangement is shown in FIG. 2. Here there are four optical branches, each of a different length. The switch 29 can be connected to any of the four optical branches, meaning there are four switching positions. Alice and Bob can assign a two-digit binary value to each optical branch. For example, optical branch 21 is assigned the bit values 00. Optical branch 22 is assigned 01, optical branch 23 is assigned 10 and optical branch 24 is assigned 11. In this arrangement, therefore, each photon transmitted and detected by Alice results in the generation of two bit values shared by Alice and Bob.

Figure 3:
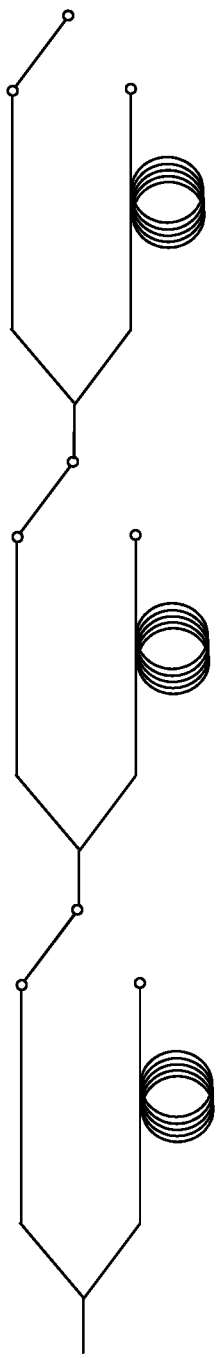
FIG. 3 is a schematic drawing of a further alternative optical branch arrangement in accordance with an embodiment of the disclosure.

FIG. 3 shows an alternative branching arrangement in which three, double-branched portions are connected in series. As with the arrangement of FIG. 2, this arrangement gives four possible path lengths through Bob. In order, from shortest to longest, these are (i) in all three portions the switch connects to the shorter of the pair of optical branches; (ii) in two of the three portions the switch connects to the shorter of the pair of optical branches and in one portion the switch connects to the longer of the pair of optical branches; (iii) in one of the three portions the switch connects to the shorter of the pair of optical branches and in two portions the switch connects to the longer of the pair of optical branches; and (iv) in all three portions the switch connects to the longer of the pair of optical branches. As in the arrangement in FIG. 2, each of the four pairs can be assigned a respective two-digit bit value, such that each photon results in the generation of two bit values shared by Alice and Bob.

The invention claimed is:

1. A method of establishing at least a portion of an encryption key, comprising:
    transmitting a first photon along a channel;
    making a modification to the channel so as to change a length of time it takes a photon to propagate along the channel;
    transmitting a second photon along the modified channel;
    determining a length of time the first photon takes to propagate along the channel;
    determining a length of time the second photon takes to propagate along the modified channel;
    using the determined lengths of time to determine the at least a portion of the encryption key; and, separately,
    using the fact that the modification has been made to the channel to determine the at least the portion of the encryption key.

2. The method as claimed in claim 1, further comprising making a record of a time the modification was made to the channel.

3. The method as claimed in claim 2, wherein using the modification made to the channel to determine the at least the portion of the encryption key uses the record.

4. The method as claimed in claim 1, wherein the at least the portion of the encryption key is established by both a first entity and a second entity.

5. The method as claimed in claim 4, wherein transmitting the first photon is performed by the first entity.

6. The method as claimed in claim 1, wherein determining the length of time the second photon takes to propagate along the modified channel comprises comparing a time the second photon was transmitted with a time the second photon was received.

7. The method as claimed in claim 1, wherein making the modification to the channel so as to change the length of time it takes a photon to propagate along the channel comprises changing a length of the channel.

8. The method as claimed in claim 7, wherein making the modification to the channel comprises causing the second photon to propagate along one of a plurality of optical branches of differing lengths.

9. The method as claimed in claim 8, further comprising using an optical switch to guide the second photon along the optical branch.

10. A system for establishing at least a portion of an encryption key, comprising:
    switching means for making a modification to a channel to form a modified channel;
    a transmitter adapted to transmit a first photon along the channel and a second photon along the modified channel;
    first controller means for:
        determining a first length of time the first photon takes to propagate along the channel;
        determining a second length of time the second photon takes to propagate along the modified channel;
        using the determined first length of time and second length of time to determine the at least the portion of the encryption key; and, separately,
    second controller means for using the fact that the modification was made to the channel to determine the at least the portion of the encryption key.

* * * * *